United States Patent [19]

Moulds, III

[11] Patent Number: 4,950,966

[45] Date of Patent: Aug. 21, 1990

[54] ADAPTIVE VIBRATION CANCELLER

[75] Inventor: Clinton W. Moulds, III, Millersville, Md.

[73] Assignee: Westinghouse Electric Corp., Pittsburgh, Pa.

[21] Appl. No.: 375,227

[22] Filed: Jul. 3, 1989

[51] Int. Cl.$^5$ ............................................. G05B 13/00
[52] U.S. Cl. .................................... 318/561; 318/640; 318/649; 267/136; 267/225
[58] Field of Search ........................ 318/561, 640, 649; 188/378, 379, 382; 267/225, 136; 384/448

[56] References Cited

U.S. PATENT DOCUMENTS

| | | | |
|---|---|---|---|
| 4,083,433 | 4/1978 | Geohegan | 188/382 |
| 4,232,364 | 11/1989 | Bibbero . | |
| 4,351,515 | 9/1982 | Yoshida | 267/225 |
| 4,643,592 | 2/1987 | Lewis et al. | 384/448 X |
| 4,796,873 | 1/1989 | Schubert | 276/136 |

OTHER PUBLICATIONS

"Stationary and Nonstationary Learning Characteristics of the LMS Adaptive Filter", Widrow, et al., Proceedings of the IEEE, vol. 64, No. 8, Aug. 1976, pp. 1151-1162.

Primary Examiner—William M. Shoop, Jr.
Assistant Examiner—Saul M. Bergmann
Attorney, Agent, or Firm—J. K. Williamson

[57] ABSTRACT

A method and apparatus for cancelling vibrations caused by periodic pulsating forces acting on a rotating shaft which are synchronous with the shaft rotation. An adaptive algorithm is implemented which utilizes the sensed velocity or acceleration of the difference between the pulsting forces acting on the shaft and an applied control force to generate an estimate of the phase shift existing therebetween to adjust a pair of adaptive weighting coefficients for sine and cosine force components which are adjusted by a least mean square (LMS) algorithm. Actuating signals for the reaction mass actuator are generated from the weighted force components which applies a controlled force to the shaft to oppose the shaft pulsation force and thus cancel the vibration. *

20 Claims, 3 Drawing Sheets

ADAPTIVE VIBRATION CANCELLER

BACKGROUND OF THE INVENTION

1. Field of the Invention

This invention relates generally to a method and apparatus for cancelling vibrations in a physical system and more particularly to the method and apparatus for the adaptive cancelling of the vibrations in a mechanical structure caused by periodic forces acting on a rotating shaft.

2. Description of the Prior Art

Unwanted vibrations in mechanical structures are an ever occurring problem due to external and internal forces acting on them. Various types of passive shock absorber systems are well known for damping these undesired vibrations. More recently, however, active or adaptive shock absorber systems have been developed where counteractive sources are generated and applied to the system in response to sensed vibrational forces occurring as a function of time. One area of particular interest in vibration damping is the cancellation of periodic pulsating forces acting on a rotating shaft. Typically, in an adaptive vibration canceller utilized in connection with a rotating shaft, the shaft pulsation force is sensed by some type of pickoff device which then feeds a signal to a controller which drives a reaction device to impart a controlled force to the shaft which opposes the shaft pulsation force and thereby cancels the shaft vibration and thus the vibration in the surrounding environment It is a primary object of the present invention, therefore, to provide an improvement in vibration cancelling systems.

It is another object of the invention to provide improvement in adaptive vibration cancelling systems And yet another object of the invention is to provide an improvement in adaptive vibration cancelling systems for structures in the vicinity of or supporting rotating shafts.

SUMMARY OF THE INVENTION

Briefly, the foregoing and other objects are achieved by a method and apparatus for cancelling vibrations caused by periodic pulsating forces acting on a rotating shaft which are synchronous with the shaft rotation. The invention incorporates an adaptation algorithm which utilizes the sensed velocity or acceleration of the difference between the pulsating forces acting on the shaft and an applied control force to estimate the phase shift existing therebetween to adjust adaptive weighting coefficients for a pair of sinusoidal force components which are adjusted by a least mean square (LMS) algorithm. Actuating signals for the reaction mass actuator are generated from the weighted force components which applies a controlled force to the shaft to oppose the shaft pulsation force and thus cancel the vibration.

BRIEF DESCRIPTION OF THE DRAWINGS

The invention will be better understood and further advantages and uses thereof will become readily apparent when considered in view of the following detailed description of the preferred embodiment when taken in conjunction with the accompanying drawing in which.

DETAILED DESCRIPTION OF THE INVENTION

Figure 1:
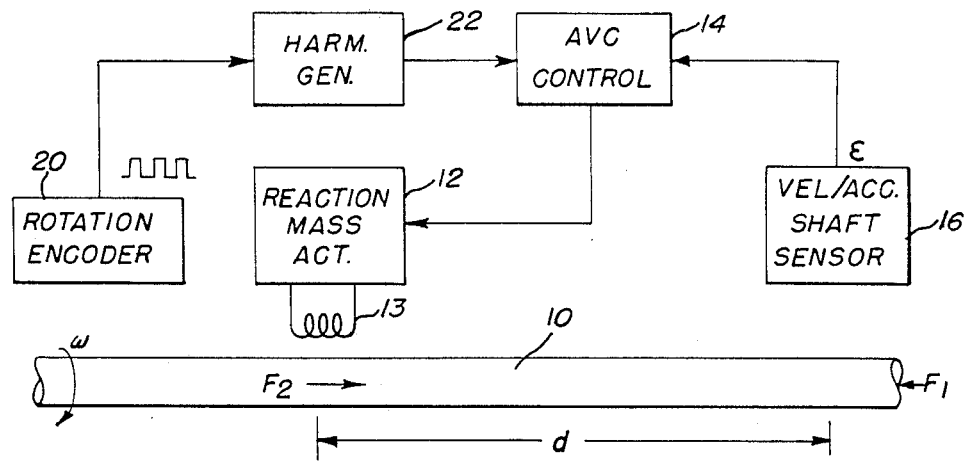
FIG. 1 is a system block diagram broadly illustrative of the subject invention.
Figure 2:
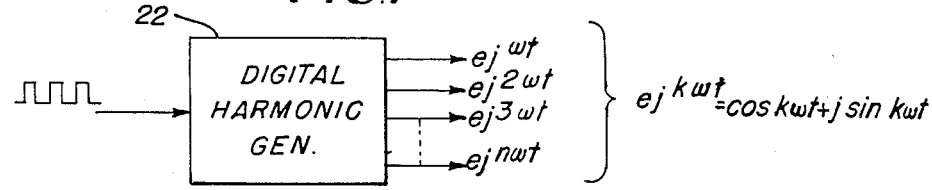
FIG. 2 is an electrical block diagram further illustrative of the harmonic generator shown in FIG. 1.

Referring now to the drawings where like reference numerals refer to like elements throughout, reference will be made first to FIG. 1 wherein there is shown the basic concept of the subject invention. The undesired vibration caused by periodic pulsating forces $F_1$ acting on a rotating shaft 10 can be cancelled by a reaction mass actuator 12 which controls a drive coil 13 for a permanent magnet or an electromagnetic, not shown, mounted on the shaft 10. The reaction mass actuator 12 operates in response to the output of an adaptive vibration Canceller (AVC) control circuit 14 which is coupled to the output signal of a velocity or acceleration sensor 16 located a predetermined distance d away and forward of the reaction mass actuator 12 and which picks up i.e. senses an externally applied pulsation force $F_1$ acting on the rotating shaft 10. The reaction mass actuator 12 in turn generates and applies a controlled force $F_2$ to the shaft 10 which opposes the shaft pulsation force $F_1$ and thereby cancels the vibration of the surrounding supporting structure, not shown The AVC control circuit 14 generates sinusoidal force components which automatically follow the harmonic frequencies of the periodic shaft pulsation force $F_1$ irrespective of rotational speed of the shaft 10 in response to a time base provided by a rotational encoder device 20 which may be comprised of an optical or magnetic incremental encoder device which generates an electrical square wave pulse output signal. The pulse output signal of the encoder 20 is fed to a harmonic generator 22 which as shown in FIG. 2, comprises a digital harmonic generator comprised of, for example, a digital look-up table to provide a plurality of digital output signals at the shaft rotational frequency and a plurality of harmonics thereof as shown by the outputs $e^{j\omega T}, e^{j2\omega T} \ldots e^{jn\omega T}$ and which includes two orthogonal sinusoidal components such that for the kth harmonic, $e^{jk\omega T} = \cos k\omega T + j \sin k\omega T$. In the subject invention, the sine and cosine waveforms at the harmonic frequencies utilized comprise force component signals which are multiplied by adaptively adjusted weights C and D and are then summed with the corresponding weighted sines and cosines from the other harmonics to determine the controlled force $F_2$ which must be applied to the shaft 10 via the reaction mass actuator 12 to counteract the force $F_1$.

In order to provide an adaptive vibration cancellation system, the output of the shaft sensor 16 is considered an error signal $\epsilon$ and which is resolved into Fourier components by separately multiplying it by the pair of sinusoidal force component signals and integrating the respective products over an entire cycle of shaft rotation from which is obtained two Fourier coefficient signals $S\epsilon$ and $C\epsilon$ at the harmonic frequency selected. The two Fourier coefficients at the selected harmonic frequency are then used to adjust the actuator's adaptive weights i.e. multiplication factors C and D at that same frequency so as to minimize the error signal. As long as the mechanical vibration system is linear, the adaptation process at one harmonic frequency will not interact with the adaptation at any other harmonic frequency.

Figure 3:
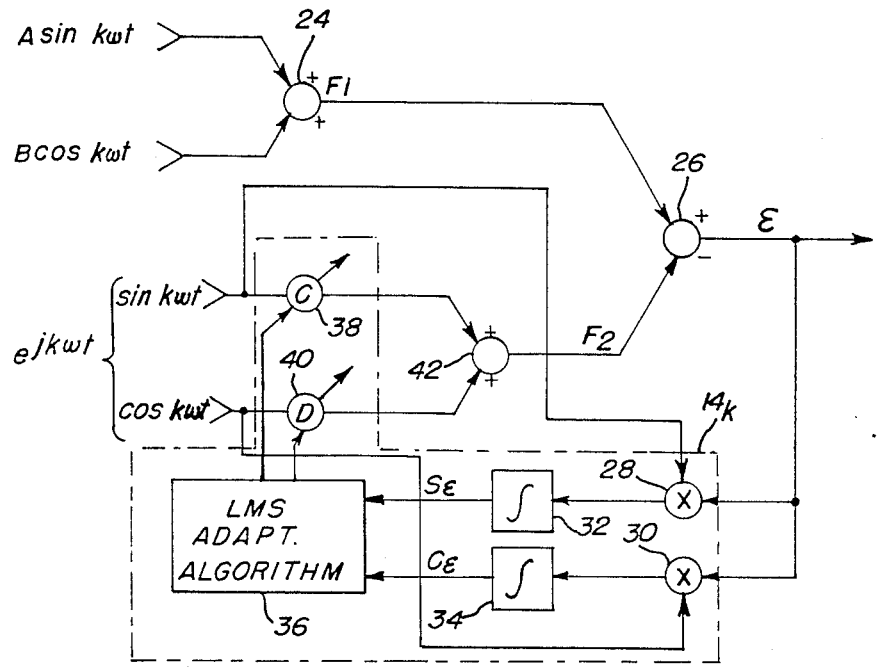
FIG. 3 is an electrical block diagram of a basic adaptive vibration canceller for a shaft which may be considered an inelastic or a rigid shaft.

A schematic diagram of this basic type of adaptive vibration cancelling system for the kth harmonic, assuming that the shaft 10 is a rigid body, is shown in FIG. 3. The shaft pulsation force $F_1$ is shown comprising the summation of two sinusoidal components at a summing point 24 of $A \sin k\omega T$ and $B \cos k\omega T$ where A and B comprise orthogonal components of the amplitude of the disturbance force. The error signal $\epsilon$ which is noted to be the output of the sensor 16 and which comprises the difference between the disturbance force $F_1$ and the counter force $F_2$ applied to the shaft 10 (FIG. 1) is shown comprising the output of the second summing point 26 which in fact comprises the shaft 10.

The adaptive vibration canceller section for the kth harmonic is shown by reference numeral $14_k$ and is shown including a pair of multipliers 28 and 30 which respectively receive inputs of the sinusoidal force components $\sin k\omega T$ and $\cos k\omega T$ from the harmonic generator 22 (FIG. 1) and the error signal appearing at circuit node 27. The outputs of the two multipliers 28 and 30 are fed to a pair of integrators 32 and 34 which provide kth harmonic Fourier coefficients $S\omega$ and $C\omega$ which are applied to a least mean square (LMS) adaptation algorithm functional block 36 which generates the weighting coefficients C and D. The weighting factors C and D are used to multiply the $\sin k\omega t$ and $\cos K\omega T$ force components for the kth harmonic from the harmonic generator 22 (FIG. 1) in the adaptive multipliers 38 and 40, the outputs of which are summed, for example, in a summing junction 42, to provide a signal for generating the composite force $F_2$ to be applied to the shaft 10. This closed loop network operates to force the value of $\epsilon$ to become zero in accordance with conventional servo practice.

The functional block 36 implements the well-known LMS adaptation algorithm of Widrow and Huff, which is described, for example, in a publication entitled "Stationary and Non-Stationary Learning Characteristics of the LMS Adaptive Filter", by Bernard Widrow, et al., and which appeared in the *Proceedings Of The IEEE*, Volume 64, No. 8, August, 1976 at pp. 1151–1162. This algorithm guarantees convergence when and only if the error signal, in this instance $\epsilon$, is a direct sum of the adaptive weight outputs and external signals. In other words, the weighting factors C and D are expressed as:

$$C = \text{old } C + \mu \int_0^T \epsilon \sin k\omega t\, dt \quad (1)$$

$$D = \text{old } D + \mu \int_0^T \epsilon \cos k\omega t\, dt \quad (2)$$

where $\epsilon = \epsilon(t)$ is the error signal, T is the sampling period and $\mu$ is a parameter which is chosen to control the speed of convergence or adaptation.

In the present invention, the adaptation equations (1) and (2) are performed at the end of each cycle of shaft rotation of the shaft 10 which as noted above, is assumed to comprise a rigid or inelastic shaft Substituting for the expression $\epsilon(t)$ and integrating an equivalent set of difference equations can be provided and which can be stated as:

$$C - \text{old } C = \frac{\mu T}{2}(A - \text{old } C) \quad (3)$$

$$D - \text{old } D = \frac{\mu T}{2}(B - \text{old } D). \quad (4)$$

These last two difference equations can also be expressed in the z-domain as:

$$\left[1 - \left(1 - \frac{\mu T}{2}\right)z^{-1}\right]C(z) = \left[\frac{\mu T}{2}\right]A(z) \quad (5)$$

$$\left[1 - \left(1 - \frac{\mu T}{2}\right)z^{-1}\right]D(z) = \left[\frac{\mu T}{2}\right]B(z) \quad (6)$$

which, as long as $0 < (\mu T/2) < 2$, can always be obtained by making $\mu$ sufficiently small, causes a stable convergence to the solution $C = A$ and $D = B$ so that $\epsilon = 0$, with the adaptation of C not interacting at all with the adaptation of D.

This adaptation algorithm works well as long as the shaft 10 can be considered a rigid body at all frequencies where shaft vibrations are to be cancelled. But in most actual cases, the vibration harmonics which are desired to be cancelled, are higher in frequency than the first few structural resonances, so that the shaft 10 must be treated as a distributed mass and consequently as an elastic system. In such instance at the kth harmonic, for example, a force gain G and phase $\phi$ exists due to the physics or properties of the shaft 10 between the sensor 16 and the reaction mass actuator 12, separated by a distance d, as shown in FIG. 1 and which may or may not be known and which may be represented as shown in FIG. 4 by a $\angle \phi$ functional block 44 between the pickoff point at the of the shaft sensor 16 i.e. node 27 and the summation point 26 of the disturbance force $F_1$ and the actuator force $F_2$.

Figure 4:
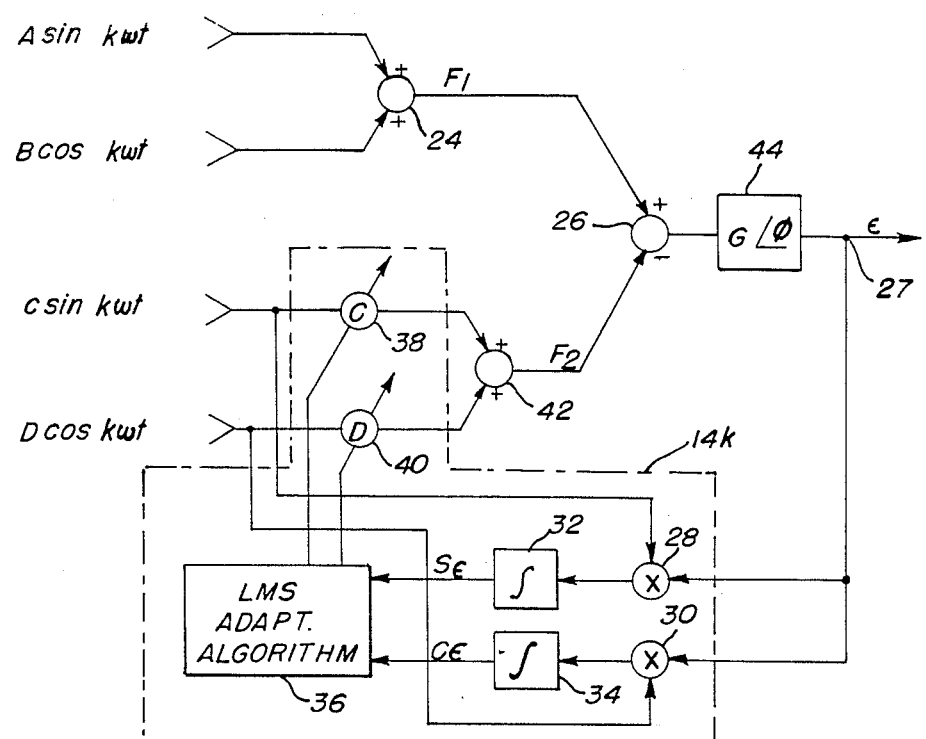
FIG. 4 is an electrical block diagram illustrative of a basic adaptive vibration canceller for a shaft which may be considered to be an elastic shaft.

Considering now the adaptive canceller loop of FIG. 4, the adaptation algorithm for determining the weighting coefficients C and D as set forth in equations (1) and (2) and the difference equations set forth in equations (3) and (4) can be replaced by a pair of strongly interacting adaptation difference equations which can readily be expressed by the following matrix equation:

$$\begin{bmatrix} ZC(z) \\ ZD(z) \end{bmatrix} = \begin{bmatrix} (1 - \lambda\cos\phi) & \lambda\sin\phi \\ -\lambda\sin\phi & (1 - \lambda\cos\phi) \end{bmatrix} \begin{bmatrix} C(z) \\ D(z) \end{bmatrix} + \begin{bmatrix} \lambda\cos\phi & -\lambda\sin\phi \\ \lambda\sin\phi & \lambda\cos\phi \end{bmatrix} \begin{bmatrix} A(z) \\ B(z) \end{bmatrix} \quad (7)$$

where $\lambda = (\mu GT)/2$ and G and $\phi$ are, as mentioned above, the gain and phase at the kth harmonic between the actuator force $F_2$ and the pickoff point of $\epsilon$.

The characteristic equation of this second-order adaptation process becomes:

$$Z^2 - 2(1 - \lambda\cos\phi)Z + (1 - 2\lambda\cos\phi + \lambda^2) = 0 \quad (8)$$

which means that the adaptation process is stable only if $$1 - 2\cos\phi + \lambda^2 < 1, \text{ or} \quad (9)$$

$$\lambda^2 - 2\lambda\cos\phi < 0, \text{ or}$$

$$(\lambda)(\lambda - 2\cos\phi) < 0.$$

The inequality of the expression (9) can only be satisfied if either $2\cos\phi < \lambda < 0$, which only occurs if $\phi$ is in the second or third quadrant, or $0 < \lambda < 2\cos\phi$, which only occurs if $\phi$ is in the first or fourth quadrant.

Therefore, no single choice of $\lambda$, which is proportional to $\mu$, the speed of adaptation or convergence parameter, will guarantee a stable adaptation for all values of phase shift $\phi$ that can occur with a non-rigid or elastic shaft 10.

When the shaft 10 is not considered a rigid element, the phase shift $\phi$ will change as shaft rotation speed changes, unlike the disturbance force component amplitudes A and B which are relatively independent of shaft rotation speed. If, on the other hand, the phase shift $\phi$ at a given time (t) is known, the adaptation algorithm of equations (1) and (2) can be modified to ensure stable adaptation as expressed in the following matrix equation:

$$\begin{bmatrix} C \\ D \end{bmatrix} = \begin{bmatrix} \text{old } C \\ \text{old } D \end{bmatrix} + \begin{bmatrix} \cos\phi & \sin\phi \\ -\sin\phi & \cos\phi \end{bmatrix} \begin{bmatrix} \mu \int_0^T \epsilon \sin k\omega t \, dt \\ \mu \int_0^T \epsilon \cos k\omega t \, dt \end{bmatrix} \quad (10)$$

for which the characteristic equation is $$\left[z - \left(1 - \frac{\mu GT}{2}\right)\right]^2 = 0 \quad (11)$$

which will be stable as along as $0 < (\mu GT/2) < 2$. The modified algorithm of matrix equation (10) can only be implemented if the actuator-to-pickoff phase shift existing between the distance d (FIG. 1) is known at all frequencies, since shaft rotation speed and its harmonics can vary over a wide range.

However, a detailed characterization of the dynamic response of such a complex mechanical system, involving an extensive analysis and measurement effort, may not only be impossible, but undesirable and uneconomical. The present invention, therefore, is directed to an algorithm which can achieve stable adaptation without any prior knowledge of the phase shift $\phi$ at a given harmonic frequency and thus provide an adaptive vibration canceller which can be relatively easily implemented.

The algorithm of the subject invention therefore U proposes using the actuator force commands $F_2$ and sensor measurements as input and output signals to estimate the phase shift $\phi$ that occurs along the shaft 10 between the reaction mass actuator 12 and the sensor 16 and then using the estimate of $\phi$ in a modified version of the equation (10) to adjust the actuator force weights C and D.

Figure 5:
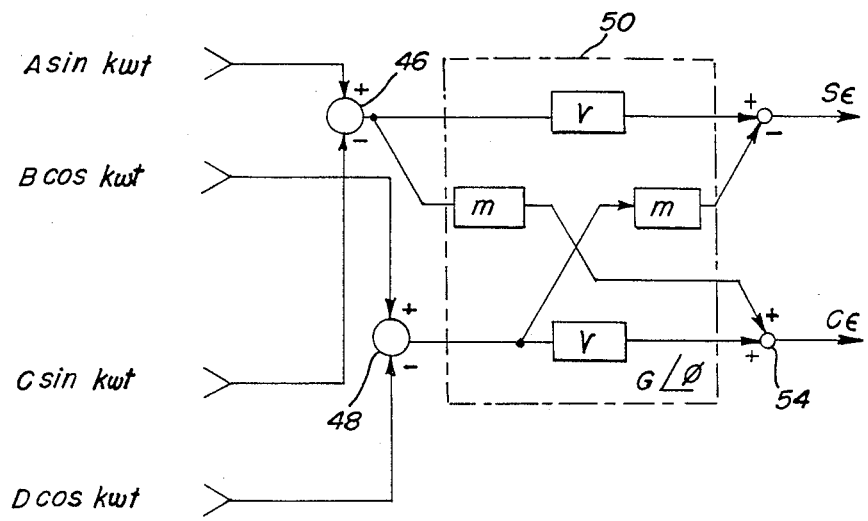
FIGS. 5 and 6 are electrical schematic diagrams helpful in understanding the preferred embodiment of the invention.

In order to illustrate the manner in which an estimate of $\phi$ is obtained, reference will first be made to FIGS. 5 and 6. Considering now FIG. 5, there is illustrated a diagram which shows the Fourier coefficients $S\epsilon$ and $C\epsilon$ of the error signal $\epsilon$, the disturbance force $F_1$, and the actuator force $F_2$ and how they are related by the real and imaginary components r and m, respectively, of the gain G and phase shift $\phi$ of the force differential. Next FIG. 5 is rearranged and redrawn as illustrated in FIG. 6 to show the actuator force components C and D being applied as an input, the Fourier coefficients $S\epsilon$ and $C\epsilon$ being outputs, and the disturbance amplitudes A and B of $F_1$ being combined with the real and imaginary components $\bar{r}$ and $\bar{m}$ as bias inputs $\bar{b_1}$ and $\bar{b_2}$ to a pair of summing junctions 56 and 58.

Figure 7:
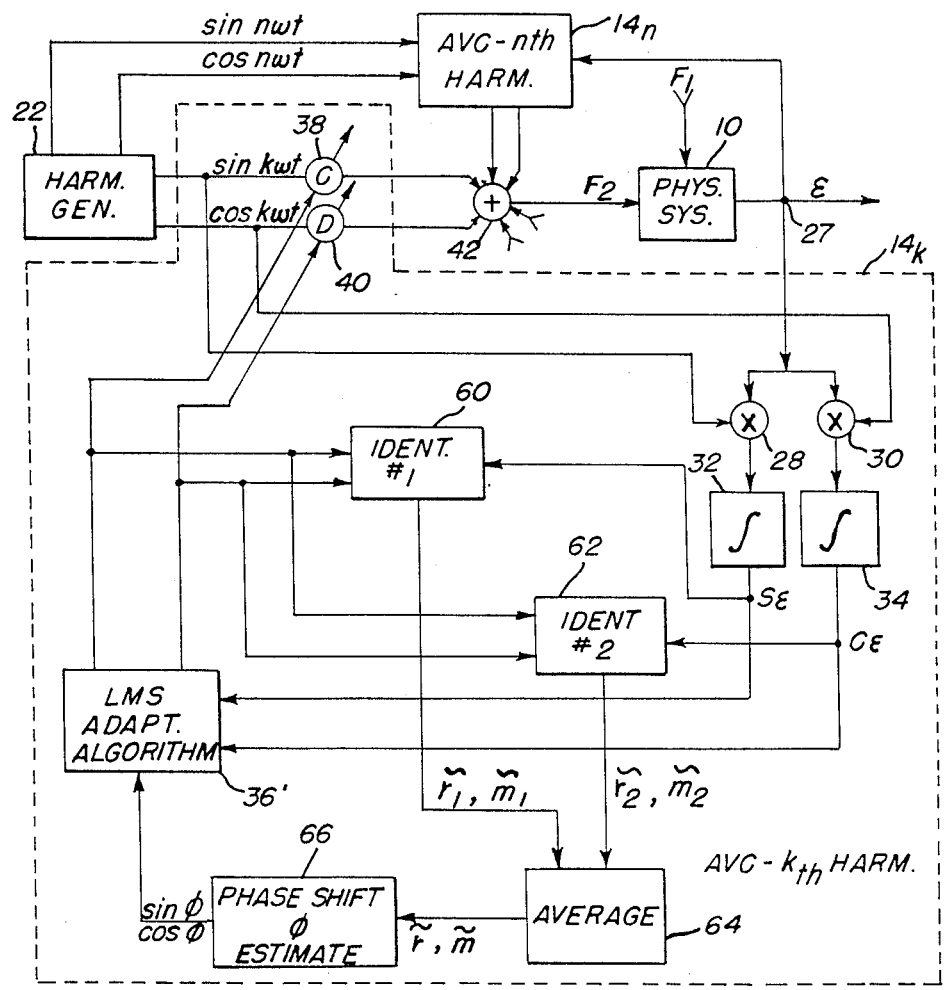
FIG. 7 is an electrical block diagram illustrative of the preferred embodiment of the invention.

Since the actuator force components C and D for the kth harmonic and the Fourier coefficients $S\epsilon$ and $C\epsilon$ can be determined from the measured value of the shaft sensor output or error signal $\epsilon$ by the multipliers 28, 30 and integrators 32, 34, shown in FIG. 4, the preferred embodiment of the invention utilizes two separate LMS based parameter identifiers 60 and 62 as shown in FIG. 7 to produce estimates $\bar{r}$ and $\bar{m}$ for each harmonic of interest to generate an estimate of the phase shift $\phi$ for the LMS adaptive algorithm block 36' which generates the adaptive weighting coefficients C and D. The two LMS identifiers 60 and 62 are shown coupled to the output of the integrators 32 and 34, respectively, as well as the LMS adaptive algorithm block 36. The first identifier 60 produces estimates $\bar{r}_1$ and $\bar{m}_1$ from the Fourier coefficient $S\epsilon$ while the identifier 62 produces estimates $\bar{r}_2$ and $\bar{m}_2$ from the Fourier coefficient $C\epsilon$. Both sets of estimates are then averaged as shown by functional block 64 providing outputs of r and m which are fed to a phase shift estimating functional block 66 which in turn feeds sine and cosine components i.e. $\sin\phi$ and $\cos\phi$ of the estimated phase shift $\phi$ to an LMS adaptive algorithm functional block 36'.

Figure 6:
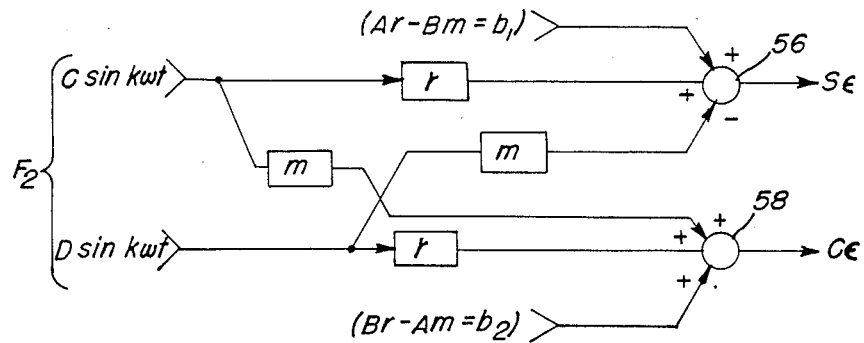

Since the Fourier coefficients $S\epsilon$ and $C\epsilon$ as shown in FIG. 6 include three components $\bar{r}$, $\bar{m}$ and $\bar{b_1}$, the identifier blocks 60 and 62 operate in the following fashion. First an error is determined, which is the difference between the $S\epsilon$ input and an estimate of $S\epsilon$ which results from a linear combination of the previous (old) $\bar{r}_1$, the previous (old) $\bar{m}_1$ and the previous (old) $\bar{b}_1$. From this an error 1 is determined according to equation:

$$\text{error } 1 = S - \text{old } \bar{r}_1 \cdot C + \text{old } \bar{m}_1 \cdot D - \text{old } \bar{b}_1 \quad (12)$$

From this relationship, new values of $\bar{r}_1$, $\bar{m}_1$ and $\bar{b}_1$ are determined in accordance with the following equations:

$$\bar{r}_1 = \text{old } \bar{r}_1 + \mu_1 \cdot C \cdot (\text{error } 1) \quad (13)$$

$$\bar{m}_1 = \text{old } m_1 + \mu_1 \cdot D \cdot (\text{error } 1) \quad (14)$$

$$\bar{b}_1 = \text{old } b_1 + \mu_1 \cdot (\text{error } 1) \quad (15)$$

As before, $\mu_1$ constitutes a scaler value which controls the speed of convergence or adaptation speed In the same manner, the second identifier functional block 62 implements a similar set of equations which are stated as:

$$\text{error } 2 = C - \text{old } \bar{m}_2 \cdot C - \text{old } \bar{r}_2 \cdot D - \text{old } \bar{b}_2 \quad (16)$$

$$\bar{r}_2 = \text{old } \bar{r}_2 + \mu_2 \cdot D \cdot (\text{error } 2) \quad (17)$$

$$m_2 = \text{old } m_2 + \mu_2 \cdot C \cdot (\text{error } 2) \quad (18)$$

$$b_2 = \text{old } b_2 + \mu_2 \cdot (\text{error } 2) \quad (19)$$

Following this, the functional block 64 averages the values of $\tilde{m}_1, \tilde{m}_2$, and $\tilde{r}_1, \tilde{r}_2$ according to the expressions:

$$\tilde{m} = \frac{\tilde{m}_1 + \tilde{m}_2}{2} \quad (20)$$

$$\tilde{r} = \frac{\tilde{r}_1 + \tilde{r}_2}{2} \quad (21)$$

The functional block 66 then calculates a gain G in accordance with the expression:

$$\tilde{G} = \sqrt{\tilde{r}^2 + \tilde{m}^2} \quad (22)$$

from which the sine and cosine values of $\phi$ are calculated from the expressions:

$$\cos\tilde{\phi} = \tilde{r}/\tilde{G} \quad (23)$$

$$\sin\tilde{\phi} = \tilde{m}/\tilde{G} \quad (24)$$

The adaptive algorithm functional block 36' then operates in response to the estimated sine and cosine values of $\phi$ to generate the adaptive weights C and D in accordance with the following matrix equation:

$$\begin{bmatrix} C \\ D \end{bmatrix} = \begin{bmatrix} \text{old } C \\ \text{old } D \end{bmatrix} + \begin{bmatrix} \cos\tilde{\phi} & \sin\tilde{\phi} \\ -\sin\tilde{\phi} & \cos\tilde{\phi} \end{bmatrix} \begin{bmatrix} \mu \int_0^T \epsilon \sin k\omega t \, dt \\ \mu \int_0^T \epsilon \cos k\omega t \, dt \end{bmatrix} \quad (25)$$

As further shown in FIG. 7, an adaptive vibration cancellation process is carried out for each of a selected number of discrete harmonic frequencies generated by the harmonic generator 22. This is demonstrated by the inclusion of an AVC functional block 14$_n$ being shown for the nth harmonic, whose outputs are coupled to the common summing network 42 along with the outputs from the kth harmonic AVC unit 14$_k$. Thus each harmonic includes its own canceller section from which a composite actuating force $F_2$ is generated.

It should also be noted that when desirable, more than one sensor 16 and reaction mass actuator 12 can be combined along the length of the physical system 10; However, the proposed algorithm and its implementation is capable of stably cancelling shaft vibrations that are synchronous with shaft rotation, even when the pickoff or sensor is relatively far away from the reaction mass actuator, the shaft is non-rigid at the frequencies of interest, and further the dynamic frequency response and the resonance modes of the shaft are not known a priori.

Having thus shown and described what is at present considered to be the preferred method and embodiment of the invention, it should be known that the same has been made by way of illustration and not limitation. Accordingly, all modifications, alterations and changes coming within the spirit and scope of the invention as exemplified in the claims attached to the specification are herein meant to be included.

I claim:

1. A method for adaptively cancelling the vibration caused by an external force acting on a dynamic body, comprising the steps of:

measuring the external force acting on said body at a first point on said body;

applying a reaction force to said body at a second point a predetermined distance away from said first point to counteract the external force acting on said body;

generating a time base signal related to the dynamics of said body;

generating a set of sinusoidal force component signals from at least one harmonic frequency of the time base signal;

determining the difference between the magnitude of the external force and the reaction force at said first point and generating an error signal therefrom;

generating a set of Fourier coefficient signals from the error signal and said set of sinusoidal force component signals;

estimating the phase shift and force existing between said first and second points from said set of Fourier coefficient signals;

generating a pair of adaptive weighting coefficients in accordance with a predetermined adaptation algorithm in response to said set of Fourier coefficient signals and the estimated phase shift;

multiplying said set of sinusoidal force component signals by a respective weighting coefficient of said set of Fourier coefficient signals to form weighted force component signals;

combining said weighted force component signals and generating a composite reaction force therefrom; and applying said reaction force to said body in response to said reaction force signal.

2. The method as defined by claim 1 wherein said adaptation algorithm comprises a least mean square adaptive algorithm.

3. The method as defined by claim 2 wherein said step of generating a time base signal comprises generating a time base signal related to the movement of said body.

4. The method as defined by claim 3 wherein said body comprises a rotating shaft and wherein said step of generating said time base signal comprises generating a time base signal in response to the rotational speed of said shaft.

5. The method as defined by claim 4 wherein said step of generating said set of Fourier coefficient signals comprises the further steps of multiplying each of said sinusoidal force component signals by said error signal and then integrating the signals resulting from said multiplying step.

6. The method as defined by claim 5 wherein said sinusoidal force component signals comprises sine and cosine components of said at least one harmonic frequency.

7. The method as defined by claim 1 wherein the step of estimating the phase shift also includes determining the force gain associated with said phase shift and generating therefrom a vector quantity of gain and phase and further comprising the steps of generating estimates of the real and imaginary components of said vector quantity and thereafter estimating the phase shift from said real and imaginary components.

8. The method as defined by claim 7 wherein said step of generating estimates of said real and imaginary components of said vector quantity comprises generating real and imaginary components from said set of related Fourier coefficient signals, averaging the real and imaginary components, and determining said phase shift from the averaged values of said real and imaginary components.

9. Apparatus for adaptively cancelling the vibration caused by an external force acting on a dynamic body, comprising:
   means for applying a reaction force to said body at a predetermined point;
   means for generating a time base signal related to the dynamics of said body;
   means for generating a set of sinusoidal force component signals of at least one harmonic frequency of the time base signal;
   difference determining means for determining the difference between the magnitude of the external force and the reaction force, and generating an error signal therefrom said difference determining means being located remote from said means for applying a reaction force;
   means for generating a set of Fourier coefficient signals from the error signal and said set of force component signals;
   means for estimating the phase shift in force, between said difference determining means and said means for applying said reaction force from said set of Fourier coefficient signals at said at least one harmonic frequency;
   means for generating a pair of adaptive weighting coefficients in accordance with a predetermined adaptation algorithm in response to said set of Fourier coefficient signals and the estimated phase shift;
   means for multiplying said set of sinusoidal force component signals by a respective weighting coefficient of said pair of Fourier coefficient signals to form weighted force component signals; and
   means for combining said weighted force component signals and generating a composite reaction force signal therefrom which is coupled to said means for applying a reaction force.

10. The apparatus as defined by claim 9 wherein said means for generating said adaptive weighting coefficients includes means for implementing a least mean square adaptive algorithm 11. The apparatus as defined by claim 10 wherein said body comprises a rotating shaft and wherein said means for generating said time base signal comprises means generating a pulse output signal in response to the rotational speed of said shaft.

12. The apparatus as defined by claim 11 wherein said means for generating a set of sinusoidal force component signals comprises a digital harmonic generator coupled to said means for generating a pulse output signal.

13. The apparatus as defined by claim 12 wherein said means for generating said set of Fourier coefficient signals includes means for multiplying each of said sinusoidal force component signals by said error signal and means coupled to said multiplying means for integrating the multiplied signals.

14. The apparatus as defined by claim 13 wherein said sinusoidal force component signals comprises sine and cosine components of said at least one harmonic frequency signal.

15. The apparatus as defined by claim 14 wherein said means for estimating the phase shift also includes means for determining the force gain associated with said phase shift and generating therefrom a vector quantity of gain and phase, and means for generating estimates of the real and imaginary components of said vector quantity and means for thereafter generating an estimate of said phase shift from said real and imaginary components.

16. An adaptive vibration canceller for vibrations caused by periodic pulsating forces acting on a rotating shaft, comprising:
   means for applying a controlled force to said shaft at a first predetermined point along said shaft for opposing said pulsating forces;
   means for sensing and generating an error signal of the force differential between said pulsating forces and said controlled force at a second predetermined point along said shaft, said second point being separated from said first point by a predetermined distance;
   means for generating a time base signal of the rotational speed of said shaft;
   means for generating a set of sinusoidal force component signals from at least one harmonic frequency of said time base signal;
   means for generating a set of Fourier coefficient signals from said error signal and said force component signals for said at least one harmonic frequency;
   means responsive to said Fourier coefficient signals for estimating the phase shift between said pulsating force and said control force and generating at least one output signal therefrom;
   means coupled to said estimating means for generating a set of adaptive weighting coefficients in response to said one output signal; and
   means for selectively multiplying said set of force component signals by said adaptive weighting coefficients, forming weighted force component signals, combining the weighted fore component signals to provide a composite signal, and feeding said composite signal to said means for applying said controlled force to said shaft.

17. The vibration canceller as defined by claim 16 wherein said means for generating said set of adaptive weighting coefficients includes means for implementing a least mean square algorithm.

18. The vibration canceller as defined by claim 17 wherein said means for estimating the phase shift includes means for determining the force gain associated with said phase shift and generating therefrom a vector quantity of gain and phase, and means for generating estimates of the real and imaginary components of said vector quantity and means for thereafter generating an estimate of said phase shift from said real and imaginary components.

19. The vibration canceller as defined by claim 18 wherein said means for generating estimates of the real and imaginary components of said vector quantity comprises first identifier means responsive to one of said set of Fourier coefficient signals to generate a first set of estimates of real and imaginary components of said vector quantity, second identifier means responsive to another of said set of Fourier coefficient signals to generate a second set of estimates of the real and imaginary components of said vector quantity, means for averaging both sets of said real and imaginary components of said vector quantity, and means for generating two said output signals corresponding to the sine and cosine of the estimated phase, said two outputs signals being coupled to said means for generating said set of adaptive weighting coefficients.

20. The vibration canceller as defined by claim 19 wherein said means for generating a time base signal comprises an electrical pulse generator responsive to shaft rotation providing a pulse signal output, and wherein said means for generating a set of sinusoidal force component signals comprises a digital harmonic frequency generator providing a plurality of digital outputs including the fundamental and a predetermined number of harmonic frequencies thereof.

* * * * *